United States Patent
Gaur et al.

(10) Patent No.: US 6,618,814 B1
(45) Date of Patent: Sep. 9, 2003

(54) SYSTEM FOR CONSERVING POWER BY CEASING AT LEAST ONE CLOCK SIGNAL FROM PHY LAYER TO MAC LAYER IN NETWORK ADAPTER IF SIGNAL FROM CABLE IS NOT DETECTED

(75) Inventors: Daniel R. Gaur, Beaverton, OR (US); Timothy E. W. Labatte, Portland, OR (US); David L. Chalupsky, Banks, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/539,300

(22) Filed: Mar. 30, 2000

(51) Int. Cl.[7] ................................. G06F 1/28
(52) U.S. Cl. ................. 713/323; 713/322; 713/324
(58) Field of Search ................. 713/300, 320, 713/323, 324, 322; 340/286.01, 286.02; 370/242, 245; 375/295; 379/350, 413.02, 413.03; 709/224, 227

(56) References Cited

U.S. PATENT DOCUMENTS

| | | | | |
|---|---|---|---|---|
| 5,822,302 A | * | 10/1998 | Scheetz et al. | 370/245 |
| 6,169,475 B1 | * | 1/2001 | Browning | 340/286.02 |
| 6,269,104 B1 | * | 7/2001 | McLaughlin et al. | 370/464 |
| 6,285,726 B1 | * | 9/2001 | Gaudet | 375/376 |
| 6,385,208 B1 | * | 5/2002 | Findlater et al. | 370/419 |
| 6,477,199 B1 | * | 11/2002 | Agazzi et al. | 375/232 |
| 6,487,214 B1 | * | 11/2002 | Bachar | 370/445 |

* cited by examiner

Primary Examiner—Thomas Lee
Assistant Examiner—Thuan Du
(74) Attorney, Agent, or Firm—Blakely, Sokoloff, Taylor & Zafman LLP

(57) ABSTRACT

A method for determining if a cable is present at a network connection, and adjusting a power signal to the network connection depending upon whether or not a cable is present is disclosed.

17 Claims, 4 Drawing Sheets

SYSTEM FOR CONSERVING POWER BY CEASING AT LEAST ONE CLOCK SIGNAL FROM PHY LAYER TO MAC LAYER IN NETWORK ADAPTER IF SIGNAL FROM CABLE IS NOT DETECTED

FIELD OF THE INVENTION

The present invention relates to the field of power consumption at a network connection. More specifically, the present invention relates to power conservation at a network connection.

BACKGROUND OF THE INVENTION

Power consumption is an important aspect of computer systems, particularly in mobile computer systems such as laptops, where laptops consume power from a limited source, typically a battery. Included in a laptop is a network adapter. The network adapter consumes power even when there is no cable connected to the network adapter. However, because the laptop is mobile, the laptop may be disconnected from the network by removing the network cable from the network adapter and moved to a different location and reconnected onto the network by reconnecting the network cable into the network adapter. In order to quickly re-establish the network connection, even though the laptop does not have a network cable connected to the network adapter, during the move from one location to another, the network adapter consumes power. The alternative would be to power down the network adapter and fully reset the network adapter hardware and reload the network adapter driver to re-establish the network connection at the different location, which consumes large amounts of power for the reset and reload processes draining battery power.

Network adapters are typically transceivers with the network adapters having a transmitter and a receiver component. Typically in a prior art network adapter, power consumption of the network adapter is not controlled depending upon whether or not a network connection exists (i.e., whether or not a network cable is connected to the network adapter receiving and transmitting network signals). In the prior art network adapter, the receiver component is typically consuming power by actively "listening" for incoming signals off the network cable. Additionally, the transmitter component of the network adapter is also consuming power by actively attempting to transmit a network adapter link information and trying to establish a connection even though there may not be a network cable connected to the network adapter. This allows for quick re-establishing of the network connection from a different location once the network cable is re-attached to the network adapter.

In some prior art network adapters, power consumption by the network adapters may be turned to a low power consumption state when there is no network connection. However, typically in the prior art network adapter with the low power consumption state, once the network connection is re-established, the network adapter completely resets itself and requires a network adapter driver to be reloaded in order to re-establish the connection. This means that in order to re-establish the network connection from a different location, a large amount of power is consumed by the network adapter.

BRIEF DESCRIPTION OF THE DRAWINGS

The present invention is illustrated by way of example and not by way of limitation in the figures of the accompanying drawings, in which the like references indicate similar elements and in which.

DETAILED DESCRIPTION

In the following detailed description, numerous specific details are set forth in order to provide a thorough understanding of the present invention. However, those skilled in the art will understand that the present invention may be practiced without these specific details, that the present invention is not limited to the depicted embodiments, and that the present invention may be practiced in a variety of alternate embodiments. In other instances, well known methods, procedures, components, and circuits have not been described in detail.

Parts of the description will be presented using terminology commonly employed by those skilled in the art to convey the substance of their work to others skilled in the art.

Various operations will be described as multiple discrete steps performed in turn in a manner that is helpful in understanding the present invention. However, the order of description should not be construed as to imply that these operations are necessarily performed in the order they are presented, or even order dependent. Lastly, repeated usage of the phrase "in one embodiment" does not necessarily refer to the same embodiment, although it may.

Briefly, the present invention provides a method and apparatus that determines whether or not a network cable is present in a network adapter and adjusts the power consumption state at the network adapter depending on whether or not a network cable is present. By adjusting the power consumption state at the network adapter, the present invention allows a mobile computer system to consume less power and quickly re-establish a network connection through the network adapter while not connected to a network depending upon whether or not a network cable is present in the network adapter.

It should be appreciated by those skilled in the art that one method for adjusting power relates to adjusting a clock signal to components within an electronic system driven by the clock signal (i.e., if a component driven by a clock signal does not receive a clock signal, the component will not function, and therefore will consume less electrical power).

Figure 1:
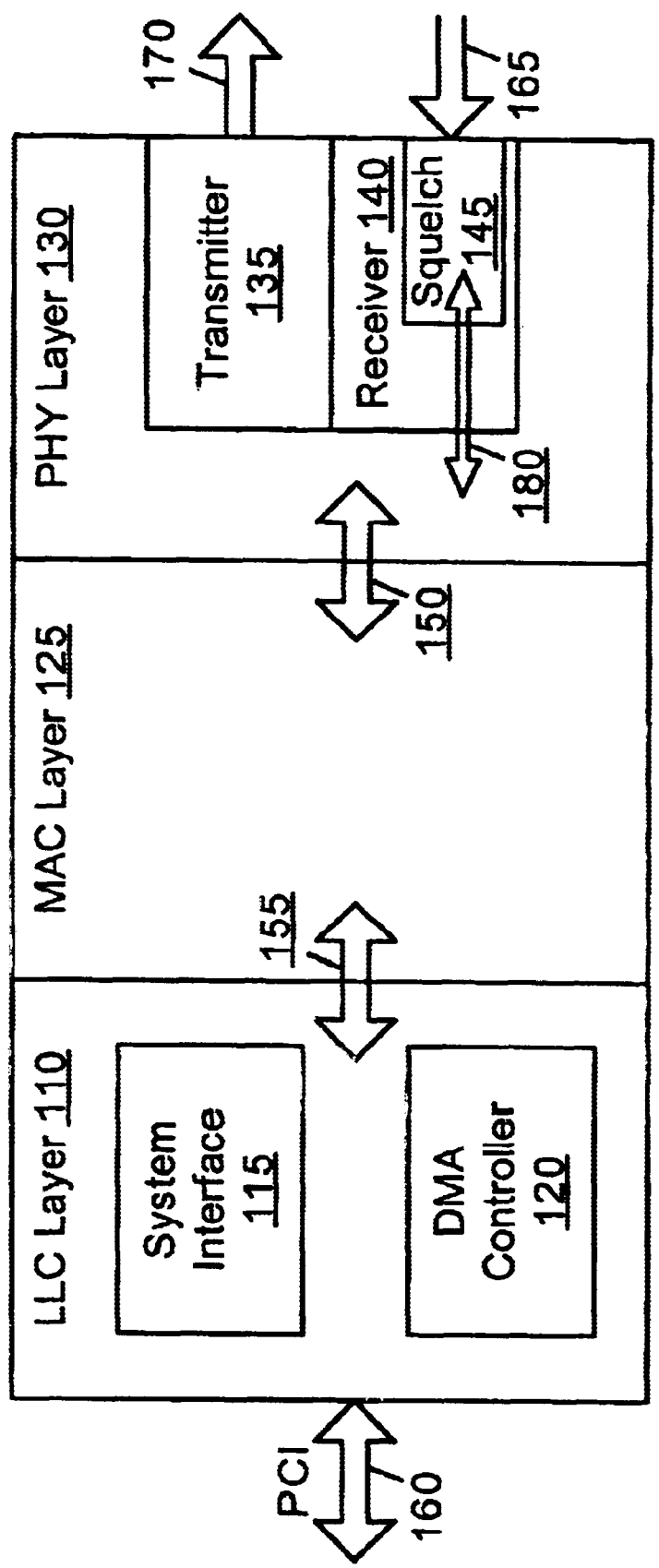
FIG. 1 illustrates a block diagram of a network adapter upon which an embodiment of the present invention may be practiced.

FIG. 1 illustrates a block diagram of a network adapter upon which an embodiment of the present invention may be practiced for determining whether or not a network cable is present in a network adapter and adjusting the power consumption state at the network adapter depending on whether or not a network cable. In FIG. 1, a network adapter 100 is illustrated with its pertinent layers. Shown in FIG. 1, the network adapter 100 may be made up of a logical link control (LLC) layer 110, a media access control (MAC) layer area 125, and a physical (PHY) layer area 130. Also shown in FIG. 1, the LLC layer may incorporate a system interface 115 and a direct memory access (DMA) controller 120. Additionally, within the PHY layer is a transmitter 135 and a receiver 140 with a squelch component 145 incorporated within the receiver 140, where the squelch 145 may be of any type of electronic circuitry to detect a voltage level such as, but not limited to, a comparator. It should be appreciated by those skilled in the art that the network adapter 100 shown in FIG. 1 is layered following a layering scheme well known in the art and is not, therefore, described in greater detail. Additionally, the functions of LLC layer 110 and the MAC layer 125 are well known in the art and also are not described in greater detail.

In FIG. 1, the network adapter 100 connects with a computer system (such as computer system 400 discussed below with respect to FIG. 4) through the system interface 115, incorporated in the LLC layer 110, and sends and receives data signals 160 to a peripheral component interconnect (PCI) bus (such as bus 420 shown in FIG. 4) on the computer system. The LLC layer is driven by a clock signal (not shown) from the PCI bus, and therefore, the LLC layer 110 is driven by the PCI clock. Additionally, shown in FIG. 1, the PHY layer 130 provides a clock signal 150 for the MAC layer 125, and therefore, the MAC layer is driven by the clock signal 150 from the PHY layer.

In FIG. 1, in accordance with an embodiment of the present invention, if a network cable (not shown) is no longer connected to the network adapter 100, the PHY layer 130 powers down to a level where the transmitter 135 is disabled. Additionally, the PHY layer 130 no longer provides the clock signal 150 to the MAC layer 125. Because the MAC layer 125 does not receive the clock signal 150, the MAC layer 125, in turn, ceases to be active. Furthermore, since the MAC layer 125 ceases to be active, communication 155 between the MAC layer 125 and the LLC layer 110 also ceases, and the network adapter 100 ceases to actively communicate, putting the network adapter 100 in a low power consumption state.

Even though the network adapter 100 is in a low power consumption state with the MAC layer and most of the PHY layer turned off, a clock signal 180 from within the PHY is provided to the squelch component 145. By only providing the clock signal 180 to the squelch component 145, the illustrated embodiment of the present invention reduces power consumption to approximately 8 mA as compared to approximately 150 mA during a normal power consumption state. It will be appreciated by those skilled in the art that the approximate power consumption will vary depending upon the different types of adapters known in the art.

The clock signal 180 to the squelch component 145 shown in FIG. 1, allows the receiver 140 to detect a signal 165 from a newly connected network cable (not shown). The signal 165 may be of any type of signal from the cable and need not be of a particular type. If the signal 165 is detected, the rest of the PHY layer 130 powers up and enables the transmitter 135. Additionally, the PHY layer 130 provides the clock signal 150 to the MAC layer 125 allowing the MAC layer 125 to power up as well. The MAC layer 125 and the LLC layer 110 begin to communicate 155 with one another in order to send and receive data signals 160 from the PCI bus 420 of the computer system 100. At this point, the network adapter 100 will be fully active and be in the normal power consumption state with the transmitter 135 transmitting network signals 170 and the receiver 140 receiving network signals 165 in accordance with the present invention.

Therefore, according to the teachings of the present invention, the network adapter 100 can adjust its power consumption state depending upon whether or not a network cable (not shown) is present or not. Additionally, even though the power consumption state may be adjusted to a low power consumption state, the network adapter is able to power up to a normal operating power consumption state upon detecting a network cable without a reset of the hardware and reinstallation of the network adapter driver, both of which will consume a comparatively large amount of power.

Figure 2:
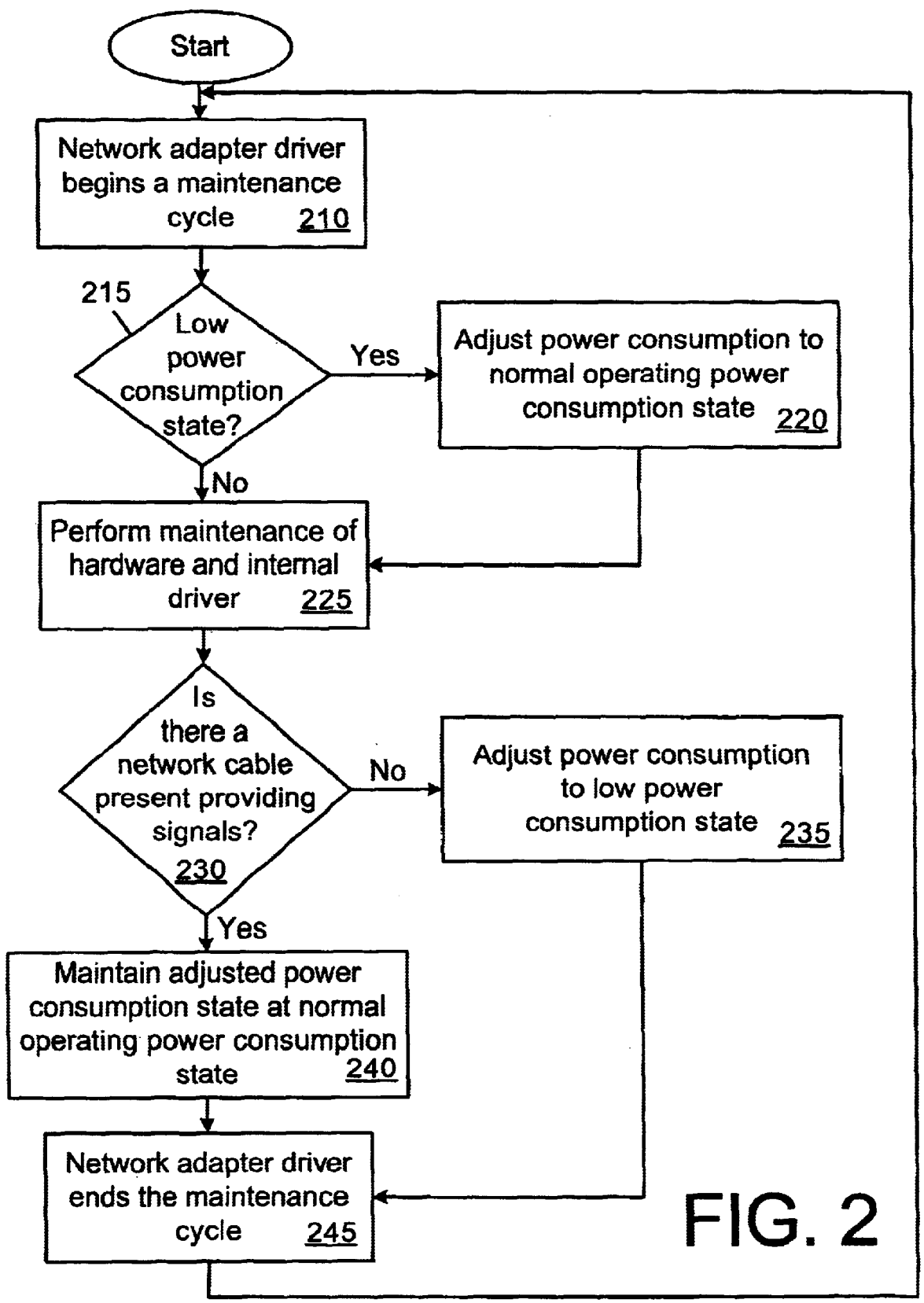
FIG. 2 demonstrates the operational flow for one embodiment of the present invention.

FIG. 2 illustrates the operational flow of one embodiment of the present invention for determining whether or not a network cable is present in a network adapter and adjusting the power consumption state at the network adapter depending on whether or not a network cable is present according to one embodiment of the present invention.

In FIG. 2, a network adapter driver begins a maintenance procedure 210. The maintenance procedure may begin at any power consumption state of the network adapter so long as the computer system is powered on. The network adapter driver determines if the network adapter is in a low power consumption state 215 because in order for the network adapter driver to perform the maintenance procedure, the network adapter should be in a normal operating power consumption state (i.e., the network adapter should be fully active).

If the network adapter driver determines that the network adapter is in the low power consumption state, the network adapter driver adjusts the power consumption of the network adapter to the normal operating power consumption state 220.

If, on the other hand, the network adapter driver determines that the network adapter is not in the low power consumption state, the network adapter driver performs the maintenance procedure of the network adapter including maintenance of its hardware and internal driver 225.

Once the network adapter driver finishing performing the maintenance procedure, the network adapter driver determines if there is a network cable present (i.e., as discussed above with respect to the squelch, are there any signals coming into the receiver from the cable connected to the network adapter from the network) 230.

If the network adapter driver determines that there is not a network cable present, the network adapter driver adjusts the power consumption of the network adapter to the low power consumption state by turning off the network adapter as discussed above 235. Once the network adapter driver adjusts the power consumption of the network adapter depending on whether or not a network cable is present, the network adapter driver completes the maintenance If, on the other hand, the network adapter driver determines that there is a network cable present by receiving a signal from the network cable from the network, the network adapter driver maintains the adjusted power consumption state at the normal operating power consumption state 240. Additionally, once the network adapter driver adjusts the power consumption of the network adapter depending on whether or not a network cable is present, the network adapter driver completes the maintenance procedure 245.

Figure 3:
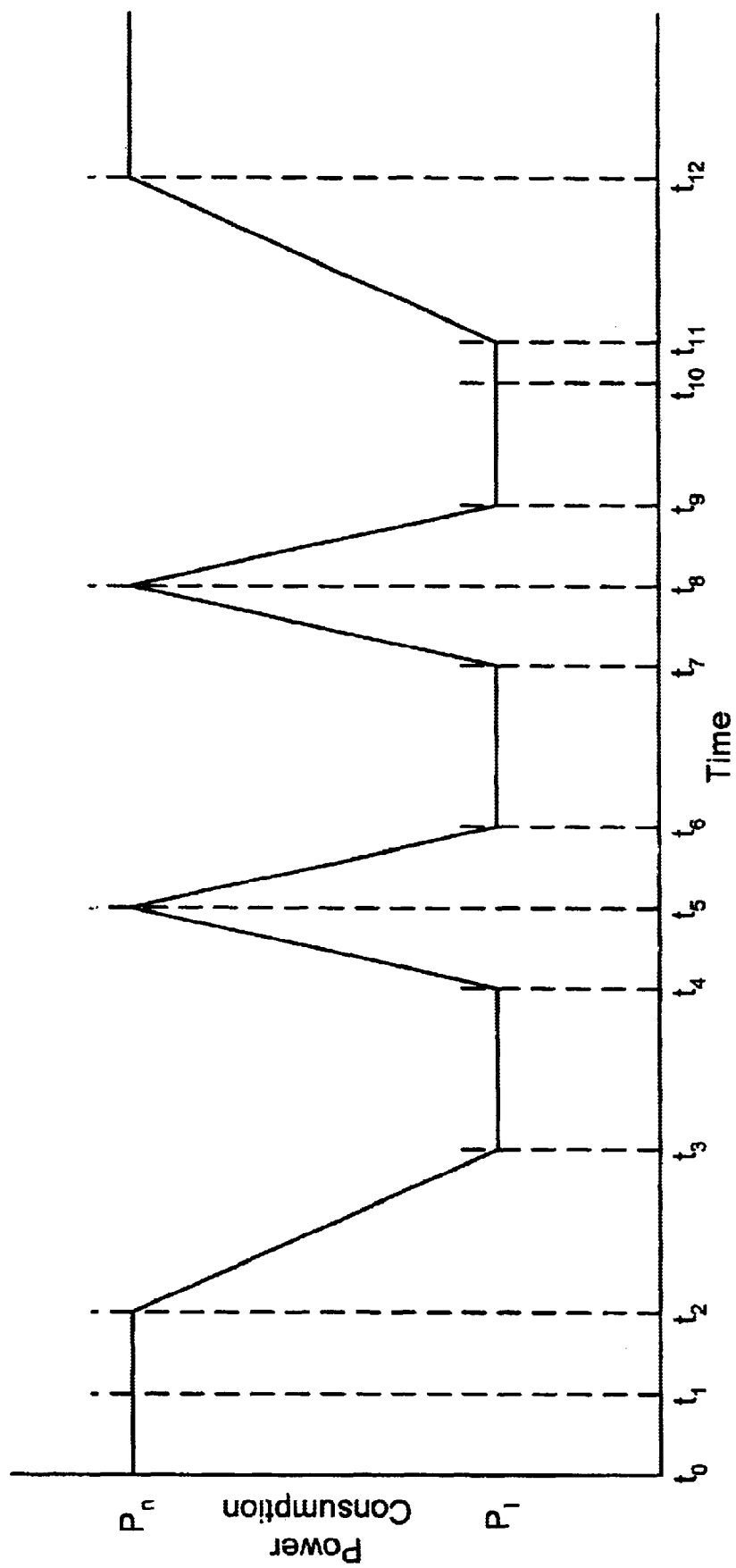
FIG. 3 illustrates a graphical representation of the one embodiment of the present invention.

FIG. 3 illustrates a graphical representation of the one embodiment of the present invention in which the network adapter driver determines whether or not a network cable is present in a network adapter and adjusts the power consumption state at the network adapter depending on whether or not a network cable is present.

Shown in FIG. 3, at time ($t_0$), the power consumption of the network adapter is at the normal operating power consumption state ($P_n$). At time ($t_1$), the network cable is no longer present in the network adapter. At time ($t_2$), the network adapter device driver adjusts the power consumption of the network adapter to low power consumption state ($P_1$).

Between times ($t_3$) and ($t_4$), ($t_4$) and ($t_7$), and ($t_9$)–($t_{11}$) the network adapter driver maintains the power consumption at the low power consumption state ($P_1$). At times ($t_5$) and ($t_8$), in order for the network adapter driver to perform the maintenance procedure, the network adapter driver briefly adjusts the power consumption to the normal operating power consumption state ($P_n$).

In FIG. 3, at time ($t_{10}$), a network cable is connected to the network adapter allowing the network adapter driver to determine that there is a network cable present. Once the network driver determines that there is a network cable present (i.e., connected to the network adapter and receives a signal), the network adapter driver adjusts the power consumption to the normal operating power consumption state ($P_n$) at time ($t_{11}$). At time ($t_{12}$), the network adapter driver maintains the adjusted power consumption state at the normal operating power consumption state ($P_n$).

Figure 4:
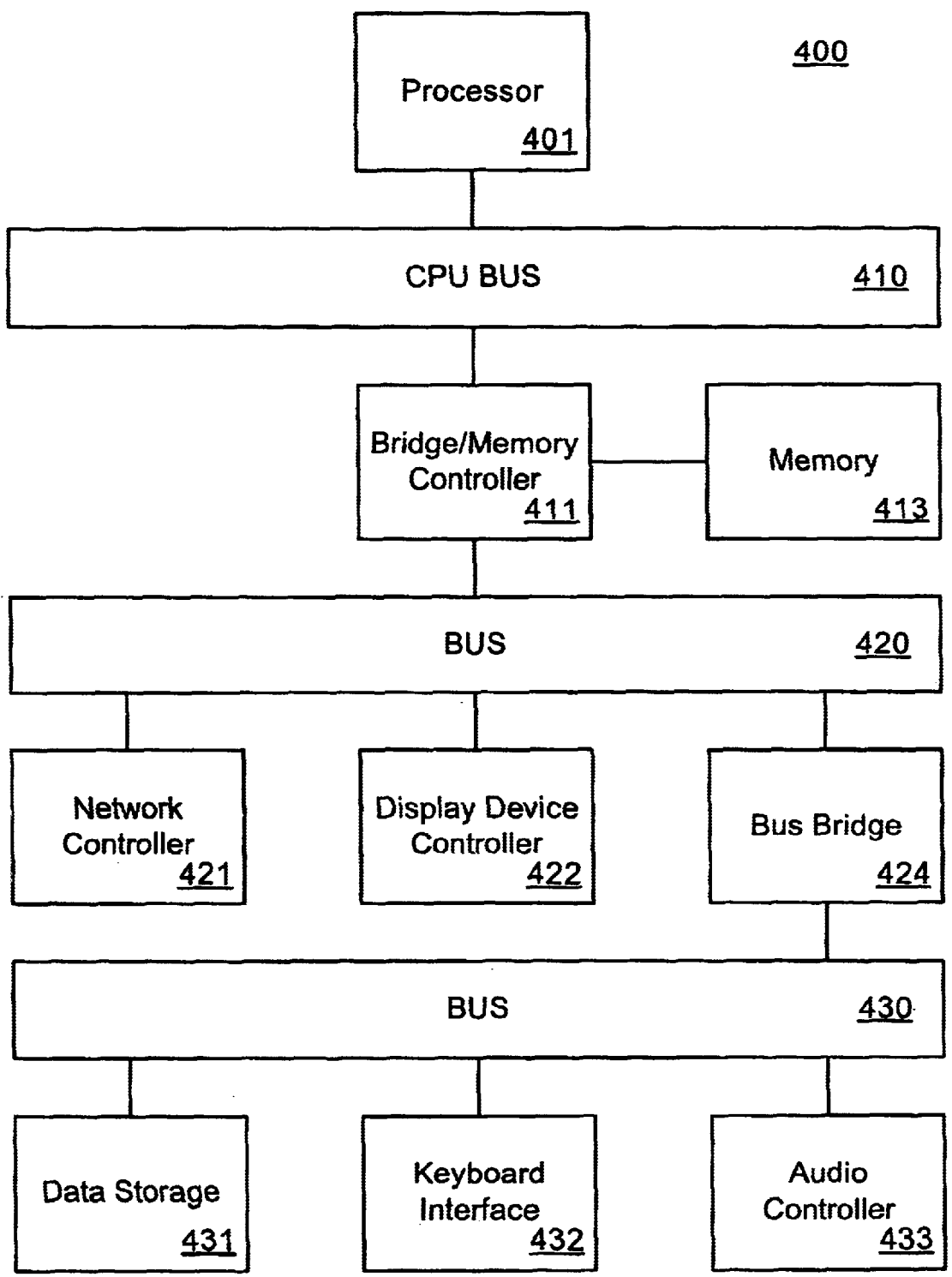
FIG. 4 illustrates a computer system upon which an embodiment of the present invention can be implemented.

FIG. 4 illustrates a computer system 400 upon which an embodiment of the present invention can be implemented. The computer system 400 includes a processor 401 that processes data signals. The processor 401 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 4 shows an example of the present invention implemented on a single processor computer system 400. However, it is understood that the present invention may be implemented in a computer system having multiple processors. The processor 401 is coupled to a CPU bus 410 that transmits data signals between processor 401 and other components in the computer system 400.

The computer system 400 includes a memory 413. The memory 413 may be a dynamic random access memory (DRAM) device, a synchronous direct random access memory (SDRAM) device, or other memory device. The memory 413 may store instructions and code represented by data signals that may be executed by the processor 401.

A bridge/memory controller 411 is coupled to the CPU bus 410 and the memory 413. The bridge/memory controller 411 directs data signals between the processor 401, the memory 413, and other components in the computer system 400 and bridges the data signals between the CPU bus 410, the memory 413, and a first I/O bus 420.

The first I/O bus 420 may be a single bus or a combination of multiple buses. As an example, the first I/O bus 420 may comprise a Peripheral Component Interconnect (PCI) bus, a Personal Computer Memory Card International Association (PCMCIA) bus, a NuBus, or other buses. The first I/O bus 420 provides communication links between components in the computer system 400. A network controller 421 is coupled to the first I/O bus 420. The network controller 421 links the computer system 400 to a network of computers (not shown in FIG. 4) and supports communication among the machines. A display device controller 422 is coupled to the first I/O bus 420. The display device controller 422 allows coupling of a display device (not shown) to the computer system 400 and acts as an interface between the display device and the computer system 400. The display device controller 422 may be a monochrome display adapter (MDA) card, a color graphics adapter (CGA) card, an enhanced graphics adapter (EGA) card, an extended graphics array (XGA) card or other display device controller. The display device (not shown) may be a television set, a computer monitor, a flat panel display or other display device. The display device receives data signals from the processor 401 through the display device controller 422 and displays the information and data signals to the user of the computer system 400.

A second I/O bus 430 may be a single bus or a combination of multiple buses. As an example, the second I/O bus 430 may comprise a PCI bus, a PCMCIA bus, a NuBus, an Industry Standard Architecture (ISA) bus, or other buses. The second I/O bus 430 provides communication links between components in the computer system 400. A data storage device 431 is coupled to the second I/O bus 430. The data storage device 431 may be a hard disk drive, a floppy disk drive, a CD-ROM device, a flash memory device or other mass storage device. A keyboard interface 432 is coupled to the second I/O bus 430. The keyboard interface 432 may be a keyboard controller or other keyboard interface. The keyboard interface 432 may be a dedicated device or can reside in another device such as a bus controller or other controller. The keyboard interface 432 allows coupling of a keyboard (not shown) to the computer system 400 and transmits data signals from a keyboard to the computer system 400. An audio controller 433 is coupled to the second I/O bus 430. The audio controller 433 operates to coordinate the recording and playing of sounds.

A bus bridge 424 couples the first I/O bus 420 to the second I/O bus 430. The bus bridge 424 operates to buffer and bridge data signals between the first I/O bus 420 and the second I/O bus 430.

Certain embodiments may include additional components, may not require all of the above components, or may combine one or more components. Those skilled in the art will be familiar with a variety of alternative networks.

In one embodiment, the present invention, as described above, is implemented using one or more computers such as the computer system of FIG. 4. In one embodiment, the present invention is implemented as software routines executed by one or more execution units within the computer(s). For a given computer system, the software routines can be stored on a storage device, such as memory 413.

In one embodiment, the software routines are written in the C programming language. It should be appreciated that the software routines may be implemented in any of a wide variety of programming languages. In alternate embodiments, the present invention is implemented in discrete hardware or firmware. For example, one or more application specific integrated circuit (ASICs) could be programmed with one or more or the above described functions of the network adapter. In another example, one or more functions of the network device could be implemented in one or more ASICs on additional circuit boards, and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a method and apparatus for determining whether or not a network cable is present in a network adapter and adjusting the power consumption state at the network adapter depending on whether or not a network cable is present is described.

In the forgoing description, the invention is described with reference to specific exemplary embodiments thereof. It will, however, be evident that various modifications and changes may be make thereto without departing from the broader spirit and scope of the present invention as set forth in the appended claims. The specifications and drawings are accordingly to be regarded in an illustrative rather than in a restrictive sense.

What is claimed is:

1. A method comprising:
   determining whether or not a signal is received from a cable at a network connection; and
   ceasing at least one of a plurality of clock signals from a physical (PHY) layer to a media access control (MAC) layer in a network adapter, to adjust a power signal to a low power consumption state if said signal is not received.

2. The method of claim 1, wherein said determining comprises comparing an input value to a reference value.

3. The method of claim 1, further comprising adjusting said power signal to a normal operating power consumption state if said signal is received.

4. The method of claimed 3, wherein said adjusting comprises sending and receiving a plurality of signals in a network adapter from said cable at said network connection.

5. The method of claim 1, further comprising:
   powering down a transmitter if determining that said signal is not received from said cable;
   ceasing at least one of a plurality of clock signals from a physical (PHY) layer to a media access control (MAC) layer in a network adapter).

6. The method of claim 1, wherein said determining comprises transmitting another clock signal to a receiver.

7. A storage medium having therein a plurality of instructions that are machine executable, wherein when executed, said instructions operate to determine whether or not a signal is received from a cable at a network connection and cease at least one of a plurality of clock signals from a physical (PHY) layer to a media access control (MC) layer in a network adapter, in order to adjust said power signal to a low power consumption state if said signal is not received.

8. The storage medium of claim 7, wherein said instructions further operate to compare an input value to a reference value.

9. The storage medium of claim 7, wherein said instructions further operate to adjust said power signal to a normal operating power consumption state if said signal is received.

10. The storage medium of claim 9, wherein said executing instructions further operate to send and receive a plurality of signals in a network adapter from said cable at said network connection.

11. The storage medium of claim 7, wherein said executing instructions further operate to power down a transmitter if it is determined that said signal is not received.

12. The storage medium of claim 7, wherein said executing instructions further operate to transmit another clock signal to a receiver, to determine whether or not said signal is received from said cable.

13. An apparatus comprising:
    a storage medium having therein a plurality of instructions that are machine executable, wherein when executed, said executing instructions operate to determine whether or not a signal is received from a cable at a network connection and cease at least one of a plurality of clock signals from a physical (PHY) layer to a media access control (MAC) layer in a network adapter, in order to adjust said power signal to a low power consumption state if it is determined that said signal is not received; and
    a processor coupled to said storage medium to execute said instructions.

14. The apparatus of claim 13, wherein said executing instructions further operate to compare an input value to a reference value.

15. The apparatus of claim 13, wherein said executing instructions further operate to adjust said power signal to a normal operating power consumption state if said signal is not received.

16. The apparatus of claim 15, wherein said executing instructions further operate to send and receive a plurality of signals in a network adapter from said cable at said network connection.

17. The apparatus of claim 13, wherein said executing instructions further operate to power down a transmitter if it is determined that said signal is not received.

* * * * *

UNITED STATES PATENT AND TRADEMARK OFFICE
CERTIFICATE OF CORRECTION

PATENT NO. : 6,618,814 B1
DATED : September 9, 2003
INVENTOR(S) : Gaur et al.

It is certified that error appears in the above-identified patent and that said Letters Patent is hereby corrected as shown below:

Column 4,
Line 49, after "maintenance", insert -- procedure 245. --.

Column 5,
Line 5, before "and ($t_7$)", delete "($t_4$)", and insert -- ($t_6$) --.

Column 7,
Lines 29-32, delete ";
 ceasing at least one of a plurality of clock signals from a physical (PHY) layer to a media access control (MAC) layer in a network adapter)".

Signed and Sealed this

Twenty-fifth Day of May, 2004

JON W. DUDAS
*Acting Director of the United States Patent and Trademark Office*